Aug. 4, 1942.  G. E. LOFGREN  2,292,140
ELECTRIC CORD HOLDER
Filed Nov. 28, 1939
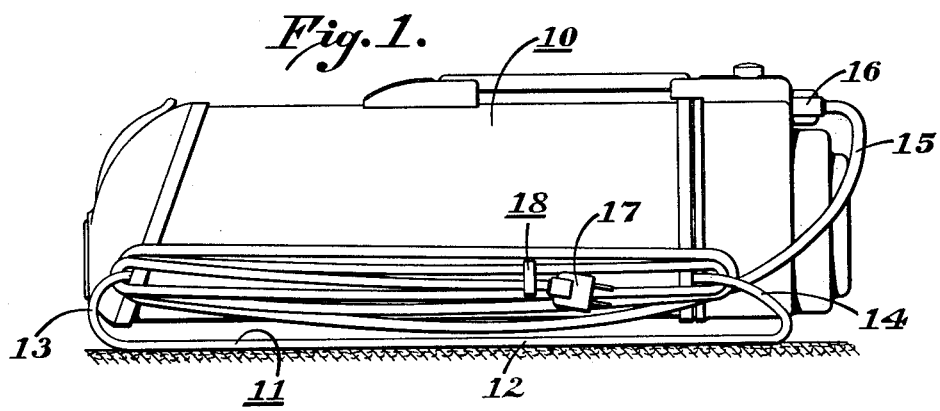
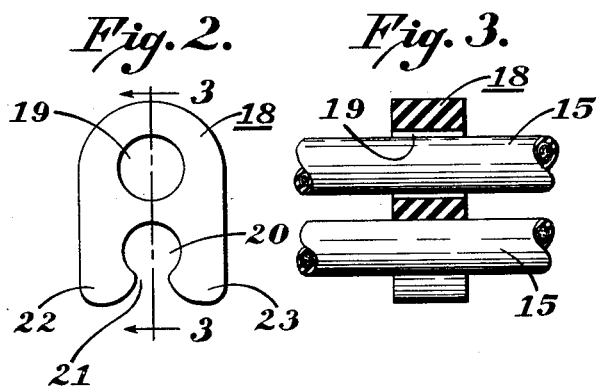
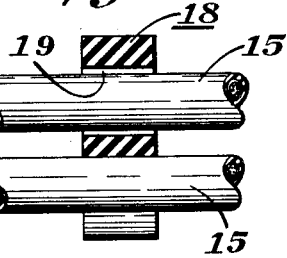
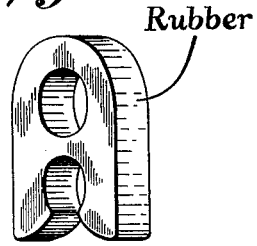
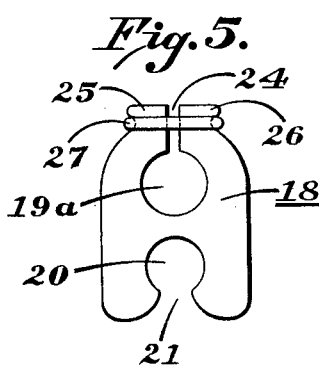
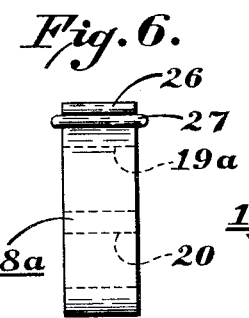
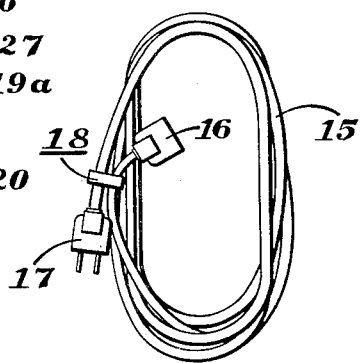
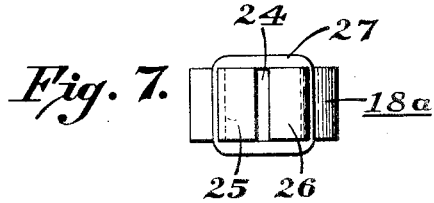
INVENTOR.
BY Gustaf Einar Lofgren
Thomas C. Betts
his ATTORNEY.

Patented Aug. 4, 1942

2,292,140

UNITED STATES PATENT OFFICE 2,292,140

ELECTRIC CORD HOLDER

Gustaf Einar Lofgren, Riverside, Conn., assignor to Electrolux Corporation, Dover, Del., a corporation of Delaware Application November 28, 1939, Serial No. 306,449

2 Claims. (Cl. 24—130)

My invention relates to an improved device for holding an electric cord, and is particularly well suited for retaining the cord in place when the latter is wound in the form of a loop.

Many electrical appliances have hooks or other means around which the cord may be wound when not in use. Usually, one end of the cord is secured to the appliance, while the other end is loose, with the result that the cord is apt to come unwound. In accordance with my invention, I provide a simple holding member which is adapted to secure the free end of the cord to either another turn of the loop or to a convenient part of the appliance. The holding device, in accordance with my invention, is also adapted to secure the two ends of a cord together when the cord has been coiled up without having been placed on supporting hooks or the like.

Further objects and advantages will be apparent from the following description, considered in connection with the accompanying drawing, which forms a part of this specification, and of which Fig. 1 is a side view of a holder, in accordance with my invention, as applied to a vacuum cleaner;

Fig. 2 is a front view of the holder shown in Fig. 1;

Fig. 3 is a cross-sectional view taken on the line 3—3 of Fig. 2;

Fig. 4 is a perspective view of the holder;

Fig. 5 is a front view of another embodiment of my invention;

Fig. 6 is a side view of the device shown in Fig. 5;

Fig. 7 is a top view of the device shown in Figs. 5 and 6; and

Fig. 8 is a view showing a holder, in accordance with my invention, employed to hold together opposite ends of a loosely coiled cord.

Referring more particularly to Fig. 1, reference character 10 designates generally a vacuum cleaner which includes a casing provided with a runner on each side 11 for supporting the casing on the surface. As shown, the runner comprises a substantially straight portion 12, which contacts the floor, and hook-shaped end portions 13 and 14, which connect the straight portion to the casing.

As is well known, an electric motor is mounted within the casing, and a flexible electric cord 15 is provided for supplying current to the motor. One end of the cord is secured to the vacuum cleaner, either permanently or removably, as by the plug 16, which engages a receptacle carried by the casing. The opposite end of the cord is provided with a plug 17, which is adapted to be received in a wall outlet when the vacuum cleaner is in use.

When the vacuum cleaner is not being used, the cord may be conveniently stored by winding it around the hook-shaped portions 13 and 14 of one of the runners 11. One end of the cord is secured in place by means of the plug 16, while the other end of the cord is secured by means of a holding device 18, constructed in accordance with my invention.

One embodiment of the device 18 is shown in detail in Figs. 2 through 4. It includes a block having an aperture 19, through which the electric cord 15 extends. The block is also provided with another aperture 20 defined by arms 22 and 23. This aperture is not completely closed, but is open to the exterior of the block by means of a slot 21 between the arms, having a width which is less than the diameter of the aperture 20. The block 18 is preferably made of resilient material, such as rubber, although this is not absolutely necessary. If desired, the portion of the block surrounding the aperture 19 may be rigid, while the arms are resilient.

The cord 15 is passed through the aperture 19 before either or both of the plugs 16 and 17 are secured to the ends of the cord. After the plugs have been secured in place, the block 18 cannot be removed from the cord and, consequently, there is no possibility of its becoming lost.

In use, after the cord has been coiled around the runner 12, one turn of the cord is forced through the slot 21 into the aperture 20, where it is retained due to the fact that the width of the slot is less than the diameter of the aperture. Inasmuch as the cord 15 includes an insulating covering of rubber or other resilient material, it may be squeezed through the slot 21, even though the block 18 is made of rigid material. However, it is desirable that the block 18, or at least the arms 22 and 23, be made of resilient material, in order that the arms may be spread to enlarge the slot 21 when the cord passes therethrough. This eliminates undue pinching of the cord, which, if it occurred repeatedly at the same place on the cord, might eventually damage the insulation.

In Fig. 8 there is shown the holder 18 used to secure together the opposite ends of the cord when the latter is wound into a loose coil. With the ends secured together in this manner, the cord is much less apt to come unwound than if the ends were free.

The embodiment illustrated in Figs. 5 through 7, is so constructed that it may be secured to a cord after the plugs have been connected to both ends of the cord. In this embodiment, the plug 18a is made of resilient material and is provided with apertures 19a and 20. A slot 24, formed between arms 25 and 26, connects the aperture 19a to the exterior of the block. The arms 25 and 26 are formed with a groove which is adapted to receive a metal ring 27, which serves to hold the arms together.

In order to secure the block 18a to a cord, arms 25 and 26 are spread sufficiently to permit the cord to pass through the slot 24 into the aperture 19a. Thereafter, the arms 25 and 26 are squeezed together sufficiently to permit the ring 27 to be passed over the ends of the arms and into the groove. When the arms spring back to their normal position, the ring 27 is thus held in place and prevents further spreading of the arms. Consequently, the cord is permanently retained within the aperture 19a.

The holder 18a, in accordance with this embodiment, is used in the same manner as the holder 18, shown in Figs. 2 through 4, and, consequently, the description of its operation need not be repeated.

While I have shown my invention as applied to a cord on a vacuum cleaner, it is obvious that it could be applied to an electric cord for any appliance. Moreover, instead of having the aperture 20 engage a turn of the coiled cord, this aperture could as well engage any convenient portion of the appliance having a suitable size. For example, the aperture 20 could engage any portion of the runner 11 illustrated in Fig. 1. It will be understood that the foregoing embodiments have been illustrated and described by way of example only and are not intended to constitute a limitation of the scope of my invention, which is to be determined by the appended claims.

What I claim is:

1. A cord holder including a block of resilient material having an aperture through a portion thereof for permanently receiving a cord, said portion including a pair of arms defining a slot extending from said aperture to the exterior of the block, a removable member bridging the free ends of said arms for limiting the width of said slot and preventing passage of the cord therethrough, and a second pair of arms extending from said portion and defining an aperture opening to the exterior of the block through a slot, the diameter of the second-mentioned aperture being substantially the same as the diameter of the cord, the width of the last-mentioned slot being less than the diameters of either the cord or said second-mentioned aperture, said second-mentioned arms being deformable to increase the width of the slot therebetween to an amount equalling the diameter of the cord.

2. A cord holder including a block having an aperture through a portion thereof of substantially the diameter of the cord for permanently receiving the cord, and a pair of resilient arms extending from said portion and defining a second aperture having an opening or passage to the exterior of the block through a slot, the diameter of the second mentioned aperture being substantially the same as the diameter of the cord, the slot being provided with walls diverging outwardly and having a minimum width substantially less than the diameter of the cord, said resilient arms being deformable outwardly to increase the width of said slot to an amount equalling the diameter of the cord.

GUSTAF EINAR LOFGREN.